UNITED STATES PATENT OFFICE.

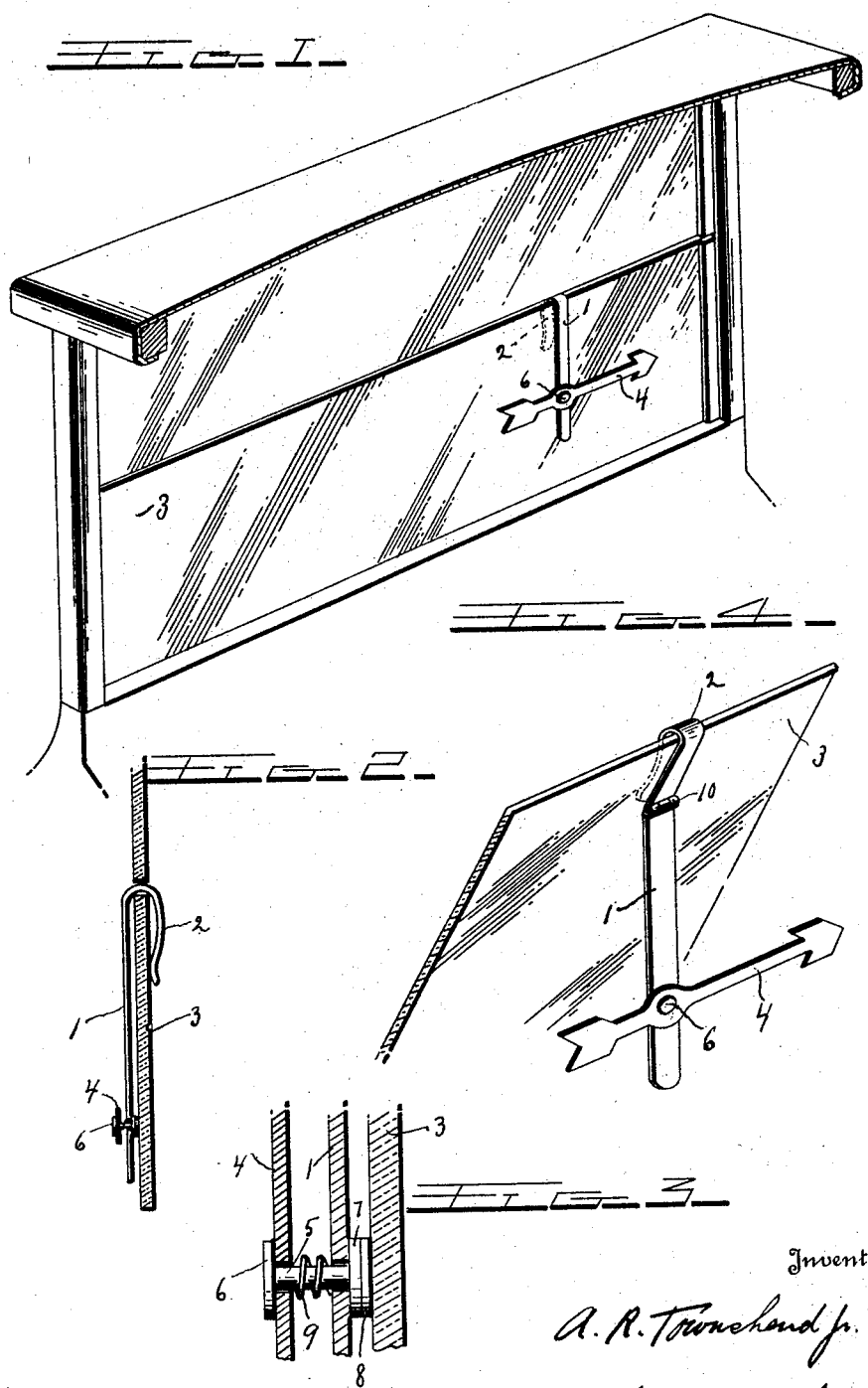

AARON R. TOWNSHEND, JR., OF WASHINGTON, DISTRICT OF COLUMBIA.

DIRECTION-INDICATOR.

1,393,854.  Specification of Letters Patent.  Patented Oct. 18, 1921.

Application filed February 23, 1921. Serial No. 447,005.

*To all whom it may concern:*

Be it known that I, AARON R. TOWNSHEND, Jr., a citizen of the United States, residing at Washington, in the District of Columbia, have invented certain new and useful Improvements in a Direction-Indicator, of which the following is a specification.

My invention relates to direction indicators for automobiles, particularly to indicators designed to signal forwardly of the automobile, and not visible from the rear. The primary object is the provision of a simple, distinctive, indicator adapted to be readily applied to the glass of a windshield at any desired point thereon.

Another object is the provision of an indicator of the type described, adapted to engage a windshield in positive clamping relation and equipped with means to prevent rattling.

A further object is the provision of an indicator of this character which is manually operable and automatically retained in any desired position.

A still further object is the provision of an indicator of this type, which is adapted to be disposed in a vertical position irrespective of the angle of a windshield to which it is applied.

With these, and such other objects in view, as will be apparent from the description, the invention resides in the novel construction, combination, and arrangement of parts hereinafter described and claimed, and illustrated in the accompanying drawings, of which;

Figure 1 is an elevation of the inner side of a windshield showing the indicator in position, Fig. 2, a section through the windshield illustrating the indicator clamped thereon, Fig. 3, an enlarged detail, partly in section, of the lower portion of the indicator, and, Fig. 4, a perspective of a modified form, with the windshield in angled position.

In detail, the invention comprises a metal strip 1 bent upon itself at one end to form a spring clamp portion 2 adapted to engage over the edge of a lower windshield glass 3 with the strip suspended on the interior face of the windshield as best shown in Fig. 1. An indicator arm, preferably in the form of an arrow 4, is pivotally mounted on the strip 1 by means of a pin 5 passed through the lower portion of the strip and arrow, and provided with an external head 6 adjacent the arrow, and an external head 7 adjacent the strip. A cushioning member 8, of felt or any suitable material, is carried by the head 7 to prevent rattling of same against the glass 3 of the windshield.

A coil expansion spring 9 is disposed between the arrow 4 and the strip 1, over the pin 5, whereby the arrow and strip will be forced apart for tight frictional engagement against the heads 6 and 7. The tension of the spring is sufficient to hold the arrow in any position to which it is moved, without impeding the ready manipulation thereof.

In the modified form illustrated in Fig. 4, the strip 1 is provided with a tight working hinge 10 adjacent its upper end at a point to clear the head of the arrow. With this construction, when the lower windshield glass 3 is angled, the arrow carrying portion of the strip can be moved into a vertical position as shown.

Normally the arrow, which may be of a very distinctive color, is disposed in a vertical position in which it is substantially hidden behind the strip. When approaching a crossing and it is desired to indicate to the traffic officer that a right or left turn is to be made, the arrow is moved in the desired direction in which it is automatically held by the spring, as described. After the turn is made the arrow is returned to normal position behind the strip.

While I have shown and described certain details and materials which enter into the construction and operation of my invention, I desire it to be understood that I do not intend to limit myself to these. It is obvious that the indicator may be clamped over the upper section of the windshield, or on the side, its action being the same irrespective of its position. Any changes may be made in the structure to meet individual requirements without departing from the scope of the invention as claimed.

I claim:—

1. A direction indicator comprising a metal strip, a clamp on one end thereof adapted to engage an edge of a windshield section, a pivot pin in the opposite end of said strip, an indicator journaled on said pin, and means to retain said indicator in spaced relation to the strip.

2. A direction indicator comprising a metal strip, a clamp on one end thereof adapted to engage an edge of a windshield section, a pivot pin in the opposite end of said strip, a head on said pin, an indicator journaled on the pin between said strip and head, and an expansion spring between said strip and indicator to retain the indicator in frictional engagement against said head.

3. A direction indicator comprising a metal strip, a clamp on one end thereof adapted to engage an edge of a windshield glass, a pivot pin in the opposite end of said strip, external heads on said pin, an indicator arm journaled on said pin between the strip and one of said heads, and a coiled expansion spring surrounding said pin between said strip and indicator arm to retain said strip and arm in spaced relation and in frictional engagement with said heads.

4. A direction indicator comprising a metal strip, a clamp on one end thereof adapted to engage an edge of a windshield glass, an indicator pivoted on the opposite end thereof, means coacting with said strip and indicator for spaced relation thereof, said means acting to retain said indicator in any desired position relative to the strip, and an anti-rattling member on said strip to abut the windshield glass.

5. A direction indicator comprising a metal strip, a clamp on one end thereof adapted to engage an edge of a windshield section, an indicator pivoted on the opposite end thereof, and means on said strip for angled positioning thereof relative to the windshield.

In testimony whereof I affix my signature.

AARON R. TOWNSHEND, Jr.